United States Patent [19]
Belsley et al.

[11] Patent Number: 4,991,793
[45] Date of Patent: Feb. 12, 1991

[54] OPTICAL CABLE PAYOFF SYSTEM

[75] Inventors: Kendall L. Belsley; William C. Imes, both of Gaithersburg, Md.

[73] Assignee: Optelecom, Inc., Gaithersburg, Md.

[21] Appl. No.: 551,038

[22] Filed: Jul. 11, 1990

Related U.S. Application Data

[63] Continuation of Ser. No. 371,095, Jun. 26, 1989, abandoned.

[51] Int. Cl.⁵ .................... B65H 49/02; B65H 59/10; B65H 59/22
[52] U.S. Cl. ................. 242/128; 242/147 R; 242/149
[58] Field of Search ........... 242/128, 129.8, 130, 242/132, 134, 137, 137.1, 138, 147 R, 149, 150 R, 155 R, 155 M, 157 R

[56] References Cited

U.S. PATENT DOCUMENTS

| | | | |
|---|---|---|---|
| 745,833 | 12/1903 | Hanson | 242/137.1 |
| 1,876,781 | 9/1932 | Snyder | 242/149 |
| 2,200,140 | 5/1940 | Willeke et al. | 242/128 |
| 2,242,053 | 5/1941 | Chapman, Sr. | 242/128 |
| 2,529,563 | 11/1950 | Miller | 68/212 |
| 2,537,165 | 1/1951 | Smith et al. | 242/157 R X |
| 2,592,818 | 4/1952 | Moessinger | 242/147 R |
| 2,629,566 | 2/1953 | King | 242/128 |
| 2,924,397 | 2/1960 | Heppner | 242/155 M |
| 3,112,899 | 12/1963 | Hosbein | 242/128 |
| 3,203,642 | 8/1965 | Hirst | 242/128 |
| 3,244,383 | 5/1966 | Ballmer et al. | 242/149 |
| 3,286,947 | 11/1966 | Erickson | 242/128 |
| 3,498,516 | 3/1970 | Lange et al. | 226/195 |
| 4,271,761 | 6/1981 | Canning et al. | 242/128 X |
| 4,326,657 | 4/1982 | Arpin et al. | 242/128 X |
| 4,573,647 | 3/1986 | Laten et al. | 244/3.12 |

Primary Examiner—Stanley N. Gilreath
Attorney, Agent, or Firm—Kerkam, Stowell, Kondracki & Clarke

[57] ABSTRACT

A payoff system for an optical cable to be carried by a moving vehicle includes a spool containing an optical fiber, and rearwardly of the spool is a cone of energy-absorbing material such as foam rubber, carpeting, fabric and the like. The rearward end of of the cone is provided with a eyelet through which the cable is threaded, followed by a braking system consisting of a pair of flat blocks or plates, and downstream of the plates is an outlet cone or eyelet.

10 Claims, 2 Drawing Sheets

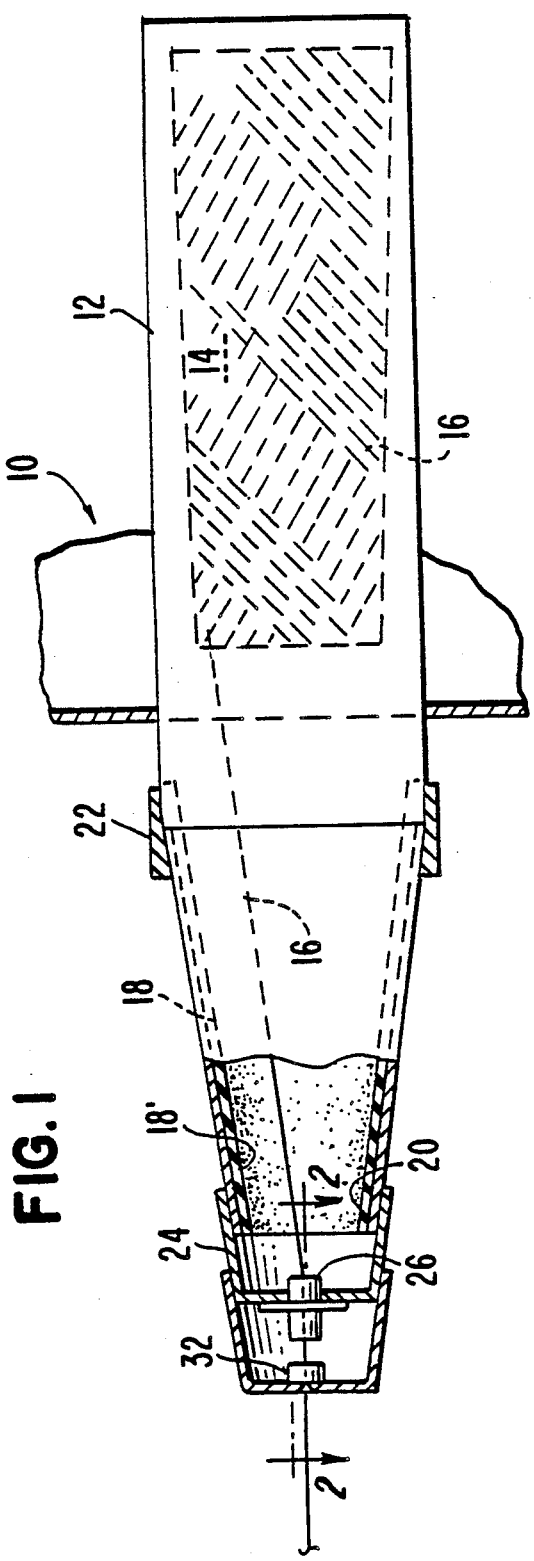
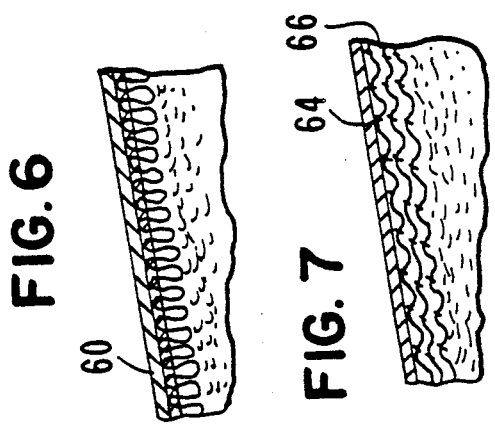
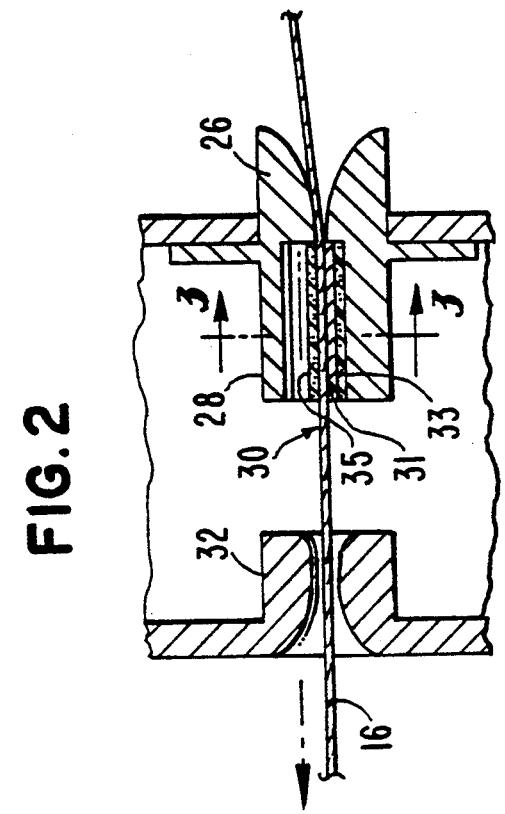

OPTICAL CABLE PAYOFF SYSTEM

This is a continuation of application Ser. No. 371,095, filed June 26, 1989, now abandonded.

The invention may be generally summarized as a payoff system for an optical cable to be carried by a rocket, missile, or a surface or airborne vehicle which consists of a spool containing an optical fiber. Rearwardly of the spool is a cone of energy absorbing material such as foam rubber, carpeting, fur, multiple layers of fabric and the like. At the rearward end of the cone, that is at the smallest diameter thereof, is an eyelet through which the cable is threaded followed by a braking system consisting of a pair of flat hard blocks such as sapphire flats, which blocks or flats are followed by an outlet cone or eyelet through which the optical cable is threaded. The flats or blocks are mounted in a heat sink and the blocks may be resiliently biased to put pressure on the cable feeding there through. The biasing means may be foam rubber, a spring, or an electrical solenoid actuated pressure applying means so that the force applied to the cable between the pair of flats may be varied.

BRIEF DESCRIPTION OF THE DRAWING

FIG. 1 is a generally schematic view of a pay-out system of the invention;

FIG. 2 is an enlarged fragmentary side elevational view of the rearward portion of the pay-out system on line 2—2 of FIG. 1;

FIG. 3 is a section on line 3—3 of FIG. 2;

FIGS. 6, 7, and 8 are fragmentary views of other forms of energy absorbing materials for construction of the energy absorbing cone.

DETAILED DESCRIPTION OF THE DRAWINGS

Figure 4:
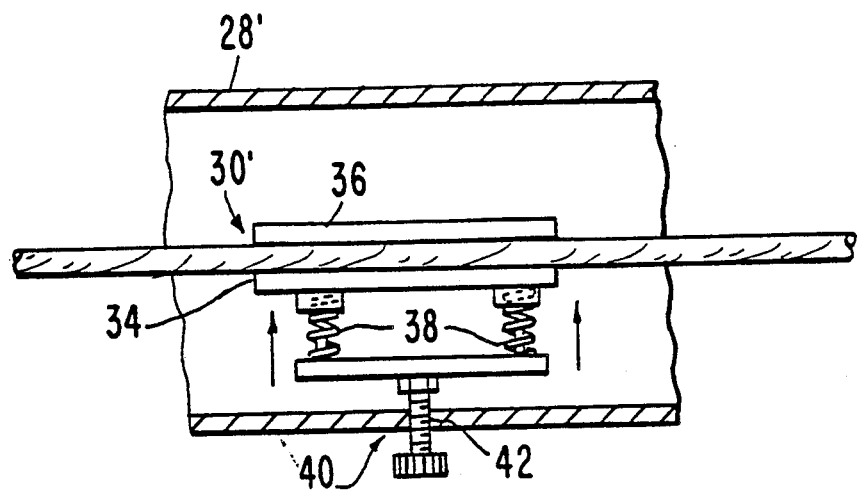
FIG. 4 is a fragmentary sectional view of a further form of tension applying means for a pair of sapphire plates.

Referring to the drawings and, in particular, FIGS. 1, 2, and 3 thereof, 10 generally designates a form of the present invention which includes a cylindrical housing 12 formed of, for example, high impact plastic, metal or combinations thereof. Within the housing 12 is contained a spool 14 having wound on its external surface, optical fiber 16. Rearwardly of the housing 12 is an energy-absorbing cone 18 which, in the illustrated form of the invention, comprises foam rubber 18'. The foam rubber cone tapers from the diameter of the housing 12 to a substantially reduced diameter at the small end 20 of the cone 18. The foam rubber is suitably attached to the rearward end of the housing 12 and, in the illustrated form of the invention, the attaching means comprises a band 22, which band may be attached by tensioning the band or by suitable compatible cements. The rearward end of the cone is received and attached in a metallic cone-like member 24, which cone-like member carries an inlet eyelet or orifice 26 more clearly illustrated in FIG. 2 of the drawing. Downstream of the inlet 26 is a metallic housing 28 which has, as one of its functions, a heat sink. Within the thermal-absorbing housing 28 is mounted a pair of plates or flats generally designated 30. In a preferred form of the present invention, the flats comprise sapphire friction surfaces between the flats of which the optical fiber 16 is threaded. Downstream of the friction surfaces is an outlet cone or eyelet generally designated 32.

Below the lower flat 31 is a foam pressure equalizing pad 33. The upper flat 35 is fixed to the housing 28.

In an operating configuration of the present invention, the length of the energy-absorbing cone 18 is about 7 inches; the distance between the small end 20 of the cone 18 and the inlet to the friction surfaces 30 is about 1 inch, and the distance between the inlet to the friction surfaces and the outlet from the exit 32 is about 1.5 inches. The length and width of the sapphire friction surfaces is about 1 inch by 0.4 inch. The overall length of the payoff system in the example is about 24 inches.

Figure 5:
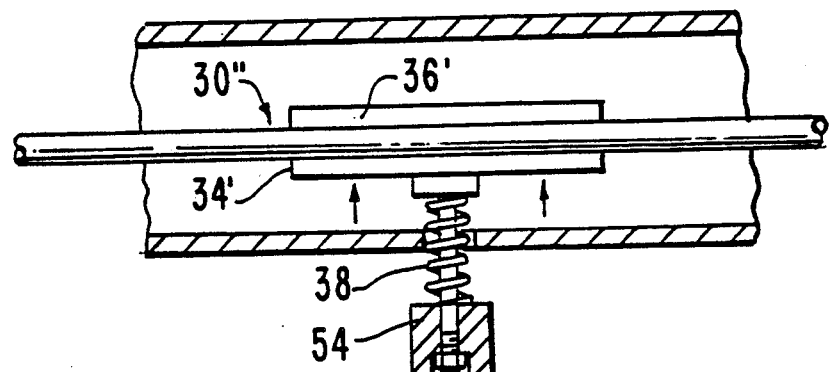
FIG. 5 is an enlarged fragmentary view of a further form of pressure applying means.

Referring now to FIG. 4, there is illustrated a form of the invention wherein the friction applied by the friction surfaces to the optical cable may be varied, and in FIG. 4 the aluminum or other metal heat-absorbing housing 28' contains the pair of friction surfaces or flats 30'. The lower plate 34 of the unit is urged into contact with the upper plate 36 by spring members 38. The forced applied by the springs 38 can be adjusted by adjusting screw 40 having threaded engagement with a portion 42 of the heat-absorbing housing 28'.

Where adjustment of the tension applied to the optical fiber is to be varied by the operator, a system such as shown in FIG. 5 may be employed. In FIG. 5, the flats or friction surfaces 30" are mounted in a heat-absorbing housing, as in the prior forms of the invention, and the lower flat 34' is urged by a coil spring 38' toward the opposite flat 36'. The tension in the spring of 38' may be varied by a reversible motor 48 connected to suitable switch means which motor rotates a pinion 50 having engagement with a rack 52 forming a portion of a housing 54 having contact with the spring 38'. Forward or reverse movement of the reversible motor 48 tensions spring 38' or relieves the tension on the spring 38' as desired within the range of operation of the pinion and rack 50/52.

Referring now to FIG. 6, there is illustrated a portion of the energy-absorbing cone generally designated 60. In this form of the invention, the innersurface comprises small-loop toweling.

Figure 8:
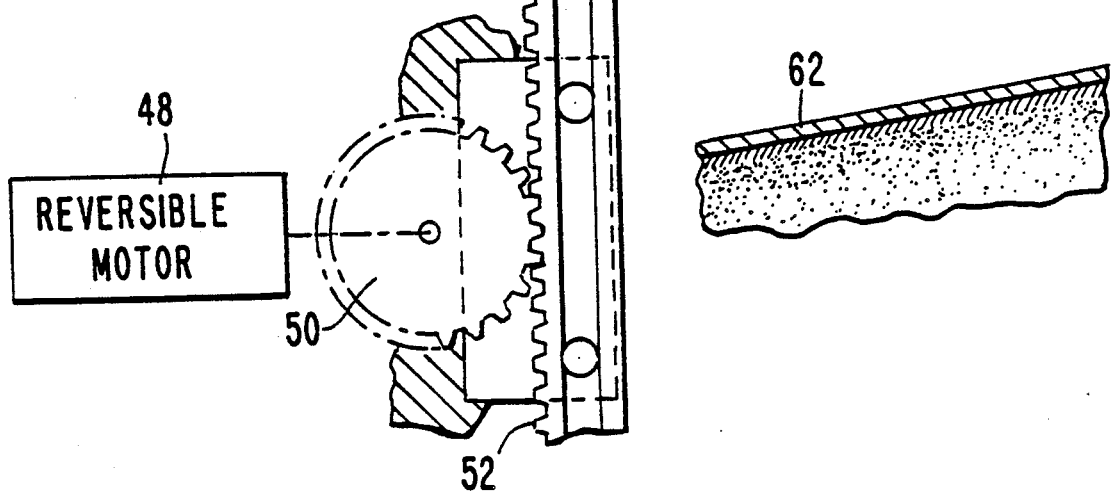

In reference to FIG. 8, a view like FIG. 6, there is illustrated a portion of the energy-absorbing cone 62 comprising short-pile carpeting.

Referring now to FIG. 7, like FIGS. 6 and 8, illustrates a portion of the energy-absorbing cone 64 comprising a plurality of sheets 66 of woven fabric secured into a pile.

Other forms of energy-absorbing materials may be employed within the scope of the present invention as the energy-absorbing cone.

We claim:

1. A payoff system for an optical fiber to be carried by a moving vehicle, comprising a spool having an axis, an optical fiber wound about the axis of the spool, a cone, the inner surface of the cone having secured thereto an energy-absorbing member selected from the group consisting of resilient foam and a textured energy-absorbing fabric, positioned rearwardly of the spool through which the optical fiber passes, a pair of flats between which the fiber passes, means mounting said flats such that the fiber passing therebetween is essentially aligned parallel to the axis of the spool, means resiliently biasing the pair of flats toward each other to place tension on the fiber as it passes therebetween.

2. The payoff system as defined in claim 1 wherein the resilient biasing means comprises a foam rubber pad.

3. A payoff system as defined in claim 1 wherein the resilient biasing means comprises springs.

4. The payoff system as defined in claim 1 wherein the energy-absorbing cone comprises foam rubber.

5. The payoff system as defined in claim 1 wherein the energy-absorbing member of the cone comprises a fabric.

6. The payoff system as defined in claim 5 wherein the fabric comprises a short-pile fabric.

7. The payoff system as defined in claim 5 wherein the fabric comprises a short-loop pile fabric.

8. The payoff system as defined in claim 5 wherein the fabric comprises multiple layers of woven fabric.

9. The payoff system as defined in claim 1 wherein the flats comprised blocks of sapphire.

10. The payoff system as defined in claim 1, including an eyelet for the optical fiber positioned rearwardly of the cone, and an outlet cone following the pair of flats.

* * * * *